Oct. 13, 1942.                C. C. DAVIS                2,298,686
                             WELDING ROD
                         Filed Dec. 24, 1941
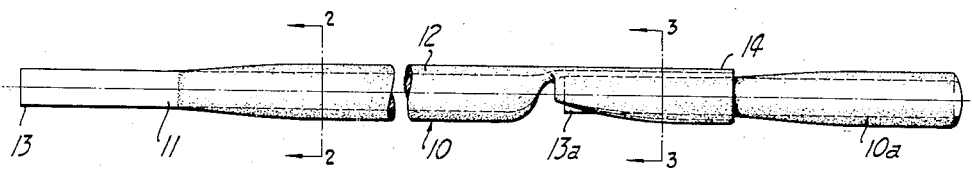
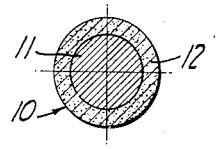   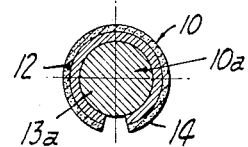
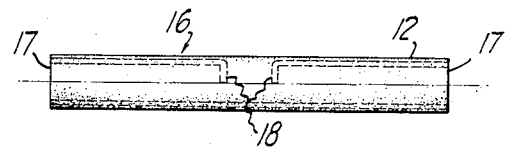
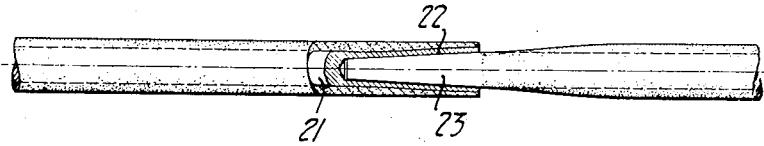
INVENTOR
Curt C. Davis
BY Harper Allen
ATTORNEY Patented Oct. 13, 1942

2,298,686

UNITED STATES PATENT OFFICE 2,298,686

WELDING ROD

Curt C. Davis, Berkeley, Calif.

Application December 24, 1941, Serial No. 424,311

2 Claims. (Cl. 219—8)

This invention relates to welding rods and is concerned more particularly with the provision of an improved welding rod construction whereby welding rods can be used up entirely during the welding operation.

It is a general object of the invention to provide a welding rod construction which will eliminate waste of welding rods in welding operations.

Another object of the invention is to provide a welding rod construction which enables the attachment of a partly used welding rod to an unused welding rod for use as a unit therewith for welding operations.

Another object of the invention is to provide an improved welding rod construction of the character referred to which is simple and convenient to use and which can be manufactured economically.

Other objects and advantages of the invention will be apparent from the following description of certain preferred embodiments thereof as illustrated in the accompanying drawing in which:

Figure 1 is an elevational view of one form of the invention showing a partly used welding rod connected to an unused welding rod;

Figure 2 is a sectional view taken as indicated by the line 2—2 in Figure 1;

Figure 3 is a sectional view through the joint between the two welding rods, as indicated by the line 3—3 in Figure 1;

Figure 4 is an elevational view of a coupling device or clip whereby two welding rods can be connected together;

Figure 5 is an elevational view, partly in section, of a modified form of joint for connecting two welding rods.

Welding rods of conventional construction as now employed for both electric and gas welding commonly consist of a metal rod or core similar to the metal parts being welded together, which is coated with a suitable material or flux. One end of the metallic core is bare for insertion in a holding socket of the welding equipment. In welding operation, conventional welding rods are commonly used until a major portion of their length is consumed, the remaining fractional portion being discarded because it is too short for further use. As a result, a substantial loss occurs because of the wasted portions of the welding rods. Various attempts have been made to enable complete use of welding rods, such as, for example, by welding two fractional portions of rods together. However, this practice does not result in a welding rod which can be used throughout its entire length for most welding operations because at the welded joint there will be no further coating available for subsequent welding operations so that defective welds will occur.

As stated above, the instant invention contemplates a welding rod construction wherein the partly used and formerly discarded end of the welding rods can be quickly and easily attached to a fresh welding rod while providing the required coating at the joint so that the entire length of every welding rod is available for welding operations.

Referring to Figures 1 to 3, one preferred form of the invention is shown in which a welding rod 10 is shown attached to a section 10a of a partly used welding rod. The welding rod 10 comprises a metallic core 11 and a covering layer or coating 12 of suitable material. One end 13 of the core 11 is left bare of the coating, while the other end 14 is formed as a socket extension with the recess therein formed complementarily to the end 13. In this way the similar end 13a of the second welding rod 10a can be snugly fitted into socket end 14 in metal-to-metal contact therewith to provide a good electrical connection. The coating 12 is extended over and around the extension 14 so as to provide a continuous supply of the coating material along the joint which is formed by the mating parts of connected welding rods. As seen in Figure 3, the socket end 14 may be split so as to grip the adjacent end 13a of the associated welding rod and provide a good surface-to-surface engagement between the parts. If desired, the inner diameter of extension 14 may be slightly less than the diameter of the end 13 so that the resilience of the split end 14 is utilized to insure a good gripping action.

The socket end 14 may be made at the end of a cylindrical rod by suitably forming such end to provide a flat sheet-like portion, which is then formed around a mandrel to the desired curvature to provide a recess to receive the portion 13a of the connected welding rod 10a in snug fashion.

Figure 4 illustrates a modified form of connecting means for two adjacent welding rods wherein a metallic clip or coupling element 16 is provided having opposite recessed ends 17, which are similar in construction to the socket end 14 shown in Figure 1. The metal of the coupling element should be the same as that of the rods. The coupling element preferably comprises a length of split tubing having its exterior surface covered with a coating 12. Adjacent the central portion of coupling 16 a pair of inwardly bent ears 18 may be provided to form stops for ends 13 of two welding rods. For use with the coupling 16 a welding rod similar to the rod 10 would be provided with similar bare ends 13. The arrangement shown in Figure 4 provides a jointed welding rod assembly including axially aligned welding rod sections which may be of substantially uniform cross section throughout their lengths so that the sections may be produced economically without any machining operations being required for effecting joints. The sleeve 16 embraces the adjacent end portions of the rods in metal-to-metal contact therewith, so that the conductivity of the assembly is substantially unimpaired by the joint between adjacent rod sections. If desired, the type of socket connection shown in Figure 1 could be formed by spot-welding or otherwise securing a coupling element 16 to a length of rod. This would preferably be effected before application of the coating.

Figure 5 shows another modified construction in which the core rod 21 of the welding rod is provided with a tapered socket 22 to receive the complementarily tapered end 23 of another welding rod. The socket end 22 may be formed by a die swedging operation or by the combination of a drilling and die swedging operation.

It will be noted that in each of the welding rod constructions illustrated herein, provision is made for the connection of two welding rods in a fashion to provide a substantially continuous coating along the entire length of the combined rods so that the entire length of the welding rods may be employed with satisfactory results in the welding operation.

I claim:

1. In a jointed welding rod assembly, a pair of axially aligned metallic welding rod sections of substantially uniform cross section throughout their lengths, a metallic coupling sleeve embracing the adjacent end portions of said rod sections and being in metal-to-metal contact therewith, a flux coating on the outside of said sleeve, and flux coatings on substantially the whole of said rod sections with the exception of the end portions thereof embraced by and in metal-to-metal contact with said sleeve whereby the conductivity of the assembly is substantially unimpaired by the joint between adjacent rod sections and flux is available for promoting welding throughout the length of the assembly.

2. In a jointed welding rod assembly, a pair of axially aligned metallic welding rod sections, a very thin metallic coupling sleeve embracing the adjacent end portions of said rod sections and being in metal-to-metal contact therewith, a flux coating on the outside of said sleeve, and flux coatings on substantially the whole of said rod sections with the exception of the end portions thereof embraced by and in metal-to-metal contact with said sleeve whereby the conductivity of the assembly is substantially unimpaired by the joint between adjacent rod sections and flux is available for promoting welding throughout the length of the assembly.

CURT C. DAVIS.